United States Patent
Takasaki et al.

(10) Patent No.: US 10,257,387 B2
(45) Date of Patent: Apr. 9, 2019

(54) IMAGE PROCESSING APPARATUS AND INFORMATION MANAGEMENT METHOD

(71) Applicant: BROTHER KOGYO KABUSHIKI KAISHA, Nagoya-shi, Aichi-ken (JP)

(72) Inventors: Hironori Takasaki, Ogaki (JP); Toyoshi Adachi, Kakamigahara (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/832,009

(22) Filed: Dec. 5, 2017

(65) Prior Publication Data

US 2018/0183977 A1 Jun. 28, 2018

(30) Foreign Application Priority Data

Dec. 22, 2016 (JP) .................. 2016-249823

(51) Int. Cl.
*G06F 3/12* (2006.01)
*H04N 1/00* (2006.01)
(Continued)

(52) U.S. Cl.
CPC ........... *H04N 1/4413* (2013.01); *G06F 21/31* (2013.01); *G06F 21/35* (2013.01); *G06F 21/45* (2013.01);
(Continued)

(58) Field of Classification Search
CPC ........ G06F 21/31; G06F 21/45; G06F 3/1236; H04N 1/00244; H04N 1/00477; H04N 1/4413; H04N 1/4433; H04N 2201/006
(Continued)

(56) References Cited

U.S. PATENT DOCUMENTS 9,955,029 B2 * 4/2018 Yamamoto ......... H04N 1/00514
9,986,113 B2 * 5/2018 Tokuchi ............. H04N 1/00413
(Continued)

FOREIGN PATENT DOCUMENTS

JP        2005198140 A    7/2005
JP        2008033391 A    2/2008
(Continued)

*Primary Examiner* — Negussie Worku
(74) *Attorney, Agent, or Firm* — Scully, Scott, Murphy & Presser, P.C.

(57) ABSTRACT

An image processing apparatus includes: an image processing device processing image data; a wireless communication wirelessly communicating with an external terminal present at a predetermined distance from the wireless communication and receiving first identification information from the external terminal; a first storage storing a first record including the first identification information and second identification information while being associated with each other; an receiving the second identification information and third identification information; a communication capable of communicating with a server, the server storing the second identification information and the third identification information while being associated with each other; a display; and a processor. The processor is configured to switch an operational mode of the image processing apparatus between a first mode for causing the image processing apparatus to standby, and a second mode in which a processing by the image processing device is executable.

20 Claims, 11 Drawing Sheets

(51) Int. Cl.
*H04N 1/44* (2006.01)
*G06F 21/31* (2013.01)
*G06F 21/45* (2013.01)
*G06F 21/35* (2013.01)
*G06F 21/60* (2013.01)

(52) U.S. Cl.
CPC ....... *G06F 21/608* (2013.01); *H04N 1/00244* (2013.01); *H04N 1/00477* (2013.01); *H04N 1/4433* (2013.01); *G06F 3/122* (2013.01); *G06F 3/1236* (2013.01); *G06F 3/1292* (2013.01); *H04N 2201/006* (2013.01)

(58) Field of Classification Search
USPC ....................................................... 358/1.15
See application file for complete search history.

(56) References Cited

U.S. PATENT DOCUMENTS

| | | |
|---|---|---|
| 2005/0152544 A1 | 7/2005 | Kizawa |
| 2011/0173686 A1 | 7/2011 | Ueno et al. |
| 2012/0140279 A1* | 6/2012 | Takasaki ............ H04N 1/00411 358/1.15 |
| 2012/0192264 A1 | 7/2012 | Sugiyama |
| 2013/0033715 A1* | 2/2013 | Takasaki ............ G03G 15/6552 358/1.12 |
| 2014/0325604 A1 | 10/2014 | Nguyenvan |
| 2016/0173703 A1* | 6/2016 | Asai ..................... H04N 1/0044 358/1.15 |
| 2017/0134393 A1* | 5/2017 | Islam .................. H04L 63/0884 |
| 2017/0244579 A1* | 8/2017 | Asai ....................... H04L 67/34 |
| 2017/0322759 A1* | 11/2017 | Tokuchi ..................... G06F 3/14 |
| 2018/0077317 A1* | 3/2018 | Kano ................... H04N 1/4413 |
| 2018/0095628 A1* | 4/2018 | Choi ..................... G06F 3/0484 |
| 2018/0176180 A1* | 6/2018 | Raman ................. G06F 9/45558 |
| 2018/0176412 A1* | 6/2018 | Takasaki ............ H04N 1/32651 |
| 2018/0234560 A1* | 8/2018 | Okuno ............... H04N 1/00233 |

FOREIGN PATENT DOCUMENTS

| | | |
|---|---|---|
| JP | 2010086205 A | 4/2010 |
| JP | 2012164298 A | 8/2012 |
| JP | 2014215956 A | 11/2014 |

* cited by examiner

Fig. 2

CONVERSION DB

| No. | Card ID | User ID | Registration Time and Date | Restriction on Function | | |
|---|---|---|---|---|---|---|
| | | | | Copy | Scan | Fax |
| 1 | 12345 | yamada | 2016/9/26 | OK | OK | NG |
| 2 | 33557 | tanaka | 2016/7/23 | OK | NG | NG |
| 3 | 12357 | sasaki | 2016/8/5 | OK | NG | NG |
| 4 | 93571 | nakano | 2016/8/30 | OK | NG | OK |

Fig. 3

DELETION DB

| No. | Card ID | Deletion Reason |
|---|---|---|
| 1 | 26845 | Expired |
| 2 | 39751 | Expired |
| 3 | 69574 | No User |

Fig. 4

AUTHENTICATION DB

| No. | User ID | Password |
|---|---|---|
| 1 | yamada | 1234 |
| 2 | tanaka | 5678 |
| 3 | sasaki | 9012 |
| 4 | nakano | 3456 |
| 5 | okada | 7890 |

IMAGE PROCESSING APPARATUS AND INFORMATION MANAGEMENT METHOD

CROSS REFERENCE TO RELATED APPLICATION

The present application claims priority from Japanese Patent Application No. 2016-249823 filed on Dec. 22, 2016 the disclosure of which is incorporated herein by reference in its entirety.

BACKGROUND

Field of the Invention

The present invention relates to an image processing apparatus configured to process image data and an information management method executable by the image processing apparatus.

Description of the Related Art

There is known a multi-function peripheral which is provided with a card reader. In such a multi-function peripheral, when a user holds an IC card closely to the card reader, a card ID is read from the IC card. Then, the card ID which has been read is converted into a user ID and a password by referring to a DB (data base) built in the multi-function peripheral, and an query is made to an authentication server regarding the converted user ID and password, thereby executing user authentication.

SUMMARY

In a multi-function peripheral described in Japanese Patent Application Laid-open No. 2008-033391, the user ID and the password are stored in the build-in DB. Accordingly, there is such a possibility that the following situation arises, namely, for example, the multi-function peripheral is broken and a request to repair the multi-function peripheral needs to be made to any outside party, in a state that the user ID and the password which essentially should not be open (exposed) to the outside party are still stored in the built-in DB (that the user ID and the password cannot be deleted).

An object of the present teaching is to provide an image processing apparatus capable of restricting a user who can execute a function, as well as capable of preventing the occurrence of such a situation that all pieces of identification information required for the authentication in the server are still retained in the inside of the apparatus in a case that the apparatus suffers from any malfunction.

According to an aspect of the present teaching, there is provided an image processing apparatus including: an image processing device configured to process image data; a wireless communication interface configured to wirelessly communicate with an external terminal, and to receive first identification information from the external terminal, the external terminal being present at a predetermined distance from the wireless communication interface; a first storage configured to store a first record, the first record including the first identification information and second identification information while being associated with each other; an interface configured to receive the second identification information and third identification information; a communication interface configured to communicate with a server, the server storing the second identification information and the third identification information while being associated with each other; a display; a processor; and a memory storing instructions, the instructions, when executed by the processor, causing the processor to switch an operational mode of the image processing apparatus between a first mode for causing the image processing apparatus to standby, and a second mode in which a processing by the image processing device is executable, wherein the instructions further cause the processor to execute a first authentication processing, an external terminal registration processing, and a second authentication processing, in the first authentication processing, under a condition that the operational mode is the first mode and that the interface receives the second identification information and the third identification information, the processor is configured to transmit, from the communication interface to the server, a combination of the second identification information and the third identification information received by the interface, under a condition that the communication interface receives, from the server, an authentication-success response indicating that the combination is stored in the server, the processor is configured to switch the operational mode from the first mode to the second mode, and under a condition that the communication interface receives, from the server, an authentication-failure response indicating that the combination is not stored in the server, the processor is configured to maintain the operational mode in the first mode; in the external terminal registration processing, under a condition that the operational mode is the second mode and that the wireless communication interface receives the first identification information from the external terminal, the processor is configured to determine whether the first record, which includes the first identification information received from the external terminal, is stored in the first storage, under a condition that the first record including the first identification information received from the external terminal is stored in the first storage, the processor is configured to cause the display to display an image indicating that the first identification information is stored in the first storage, and under a condition that the first record including the first identification information received from the external terminal is not stored in the first storage, the processor is configured to cause the first storage to store the first record including the second identification information received by the interface and the first identification information received from the external terminal while being associated with each other; and in the second authentication processing, under a condition that the operational mode is the first mode and that the wireless communication interface receives the first identification information from the external terminal, the processor is configured to determine whether the first record including the first identification information received from the external terminal is stored in the first storage, under a condition that the first record including the first identification information received from the external terminal is stored in the first storage, the processor is configured to obtain the second identification information from the first record including the first identification information received from the external terminal, and to transmit the obtained second identification information to the server, under a condition that the communication interface receives, from the server, an existence response indicating that the second identification information is stored in the server, the processor is configured to switch the operational mode from the first mode to the second mode, and under a condition that the communication interface receives, from the server, a non-existence response indicating that the second identification information is not stored in the server, the processor is configured to maintain the operational mode in the first mode, and under a condition that the first record including the first identification information received from the external terminal is not stored in the first storage, the processor is configured to maintain the operational mode in the first mode.

According to this configuration, under a condition that the operational mode is the first mode and that the second identification information and the third identification information are received by the interface, the second identification information and the third identification information are transmitted to the server via the communication interface. In the server, the authentication is performed as to whether the combination of the second identification information and the third identification information transmitted via the communication interface is registered in the server. In a case that a response, received via the communication interface from the server in response to the transmittance of the second identification information and the third identification information, is the authentication-success response, the processor switches the operational mode of the image processing apparatus from the first mode to the second mode. As a result, it is possible to execute a function for using image data. In a case that the response, received via the communication interface from the server is the authentication-failure response, the processor dose not switch the operational mode of the image processing apparatus from the first mode, and maintains the operational mode in the first mode. Accordingly, it is not possible to execute the function for using the image data.

Under a condition that the operational mode of the image processing apparatus is the second mode, that the external terminal is moved closely to be within the predetermined distance from the image processing apparatus and that the wireless communication interface receives the first identification information from the external terminal, the processor determines whether the first record, including the first identification information, is stored in the first storage. In a case that the first record including the first identification information is stored in the first storage, an image indicating that the first identification information is stored in the first storage is displayed in the display. In a case that the first record including the first identification information is not stored in the first storage, the processor causes the first storage to store the first record in which the first identification information and the second identification information which is received by the interface are associated with each other.

Further, under a condition that the operational mode of the image processing apparatus is the first mode, that the external terminal is moved closely to be within the predetermined distance from the wireless communication interface and that the wireless communication interface receives the first identification information from the external terminal, the processor determines whether the first record, including the first identification information, is stored in the first storage. In a case that the first record including the first identification information is stored in the first storage, the processor obtains the second identification information, which is associated with the first identification information, from the first record, and transmits the second identification information from the communication interface to the server. In the server, it is investigated whether the second identification information exists. In a case that a response, received by the communication interface from the server in response to the transmittance of the second identification information, is the existence response, the processor switches the operational mode of the image processing apparatus from the first mode to the second mode. As a result, it is possible to execute a function for using image data.

On the other hand, in a case that a response, received by the communication interface from the server in response to the transmittance of the second identification information, is the non-existence response, the processor does not switch the operational mode of the image processing apparatus from the first mode, and maintains the operational mode in the first mode. Accordingly, it is not possible to execute the function for using the image data. Further, also in a case that the first record, which includes the first identification information received by the wireless communication interface from the external terminal, is not stored in the first storage, the processor does not switch the operational mode of the image processing apparatus from the first mode, and maintains the operational mode in the first mode. Accordingly, it is not possible to execute the function for using the image data.

Namely, under the condition that the operational mode of the image processing apparatus is the first mode and that the interface receives the second identification information and the third identification information registered in the server, or that the wireless communication interface receives, from the external apparatus, the first identification information included in the first record which is stored in the first storage, the operational mode is switched by the processor from the first mode to the second mode, and the function for using the image data becomes executable. On the other hand, under the condition that the operational mode of the image processing apparatus is the first mode and that the interface receives the second identification information and the third identification information which are not registered in the server, or that the first identification information received from the external apparatus by the wireless communication interface does not exist in the server, or that the first record, which includes the first identification information received by the wireless communication unit from the external terminal, is not stored in the first storage, the processor does not switch the operational mode of the image processing apparatus from the first mode, and maintains the operational mode in the first mode. Accordingly, it is not possible to execute the function for using the image data.

Further, the first record including the first identification information and the second identification information is stored in the first storage, and this first record does not include the third identification information which is necessary for the authentication in the server. As a result, even in a case, for example, that the first record stored in the first storage cannot be deleted due to, for example, any malfunction of the image processing apparatus, there is not such a concern that the third identification information required for the authentication in the server might be leaked to any third party.

Accordingly, it is possible to restrict the user capable of executing the function using the image data, and to prevent all pieces of the identification information, required for the authentication in the server, namely, both of the second identification information and the third identification information, from being retained in the inside of the image processing apparatus in a case that the image processing apparatus suffers from any malfunction, thereby making it possible to eliminate such a concern that the third identification information required for the authentication in the server might be leaked to any third party.

BRIEF DESCRIPTION OF THE DRAWINGS

FIG. 2 is a view depicting an example of the configuration of a conversion DB.

FIG. 3 is a view depicting an example of the configuration of a deletion DB.

FIG. 4 is a view depicting an example of the configuration of an authentication DB.

DESCRIPTION OF THE EMBODIMENTS

In the following, a detailed explanation will be given about an embodiment of the present teaching, with reference to the accompanying drawings.

<Electrical Configuration of MFP>

Figure 1:
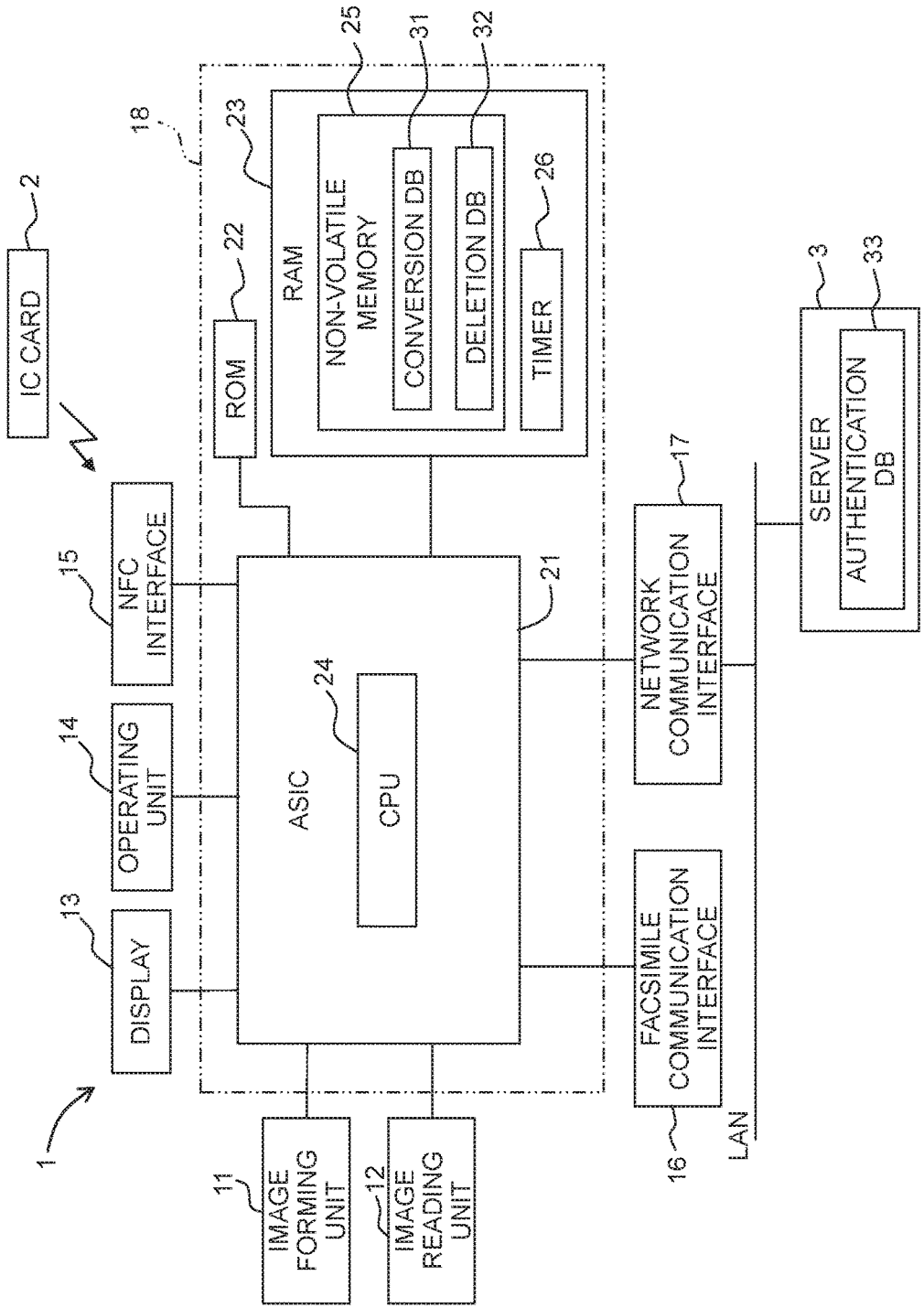
FIG. 1 is a block diagram depicting the electrical configuration of a MFP (Multi-Function Peripheral) according to an embodiment of the present teaching.

A MFP 1 (Multi-Function Peripheral 1; an example of an image processing apparatus) depicted in FIG. 1 is provided with an image forming unit 11 (an example of an image processing device), an image reading unit 12 (an example of the image processing device), a display 13, an operating unit 14 (an example of an interface), a NFC communicating unit 15 (an example of a wireless communication interface), a facsimile communicating unit 16, a network communicating unit 17 (an example of a communication interface), and a controller 18.

The image forming unit 11 is configured to form an image (color image or monochrome image) according to image data with respect to a sheet which is conveyed one by one in a conveyance route or path in the inside of the MFP 1. The system of the image formation may be an electric photographic system or an ink-jet system.

The image reading unit 12 is provided with an image sensor, an AFE (Analog Front End), etc. In the image reading unit 12, an image of an original (manuscript) is read by the image sensor. The image sensor outputs an analogue image signal to the AFE, and AFE converts the analogue image signal into a digital image data.

The display 13 is constructed, for example, of a liquid crystal display. A variety of kinds of information is displayed on the display 13.

The operating unit 14 is provided with operation keys (for example, a start key, ten keys, a cursor key, a return key, etc.). By operation of the operation keys, a variety of kinds of instruction, etc., can be inputted to the operating unit 14. Note that the operating unit 14 may be a touch key(s) provided integrally on the display 13.

The NFC communicating unit 15 is provided with an antenna and an IC chip module, etc., for wireless communication by NFC (Near Field Communication) between the NFC communicating unit 15 and a non-contact type IC card 2 (an example of an external terminal). The NFC is a wireless (radio) communication technology corresponding to ISO/IEC 14443, ISO/IEC 18092, etc., which are of the international standard, and utilizes a communication frequency of a 13.56 MHz band. The IC chip module has a configuration including a CPU, a variety of kinds of memory, etc., and a card ID peculiar to the IC card 2 is stored by the memory. In a case that the IC card 2 is held closely to (is moved closely to) the NFC communicating unit 15, an operating electric power is supplied to the IC card 2 by the electromagnetic induction, which in turn allows a communication (NFC communication) by the carrier modulation between the NFC communicating unit 15 and the IC card 2.

The facsimile communicating unit 16 is provided with a modem, etc., in which an NCU (Network Control Unit) is built therein for a facsimile communication via a telephone network.

The network communicating unit 17 is provided with a circuit, etc., for a network communication via a LAN (Local Area Network). The LAN may be a wired LAN or a wireless LAN. Further, the LAN may include both of the wired LAN and the wireless LAN. Furthermore, a server 3 is connected to the network communicating unit 17 (MFP 1) via the LAN.

The controller 18 is provided with an ASIC (Application Specific Integrated Circuit) 21, a ROM 22, a RAM 23, etc.

The ASIC 21 has a CPU 24 (an example of a processor) which is built in the ASIC 21. Image data obtained by the image reading unit 12, a control signal indicating the content of an operation of the operating unit 14, etc., are inputted to the ASIC 21. The CPU 24 executes a program(s) stored in the ROM 22, based on a signal(s) inputted to the ASIC 21, etc. By doing so, the CPU 24 controls the image forming unit 11, the image reading unit 12 and the display 13, and controls the NFC communicating unit 15, the facsimile communicating unit 16 and the network communicating unit 17 for performing communication. When the CPU 24 executes the control (program), the RAM 23 is used as a work area. Further, the RAM 23 includes a clock unit 26 which is configured to update and retain, as occasion arise, information regarding the current date and time in a rewritable and non-volatile memory 25 (an example of a memory), such as a NVRAM (Non Volatile RAM).

In the MFP 1, by the controls of the respective units by the controller 18, a Copy function, a Scan function and a Fax (facsimile) function, each using image data, are selectively executed.

The Copy function is a function for reading an image of an original with an image reading function of the image reading unit 12 to thereby obtain data of the image (image data), and of forming an image regarding the obtained image data on a sheet with an image forming function of the image forming unit 11. Namely, the Copy function is a function for forming an image, same as the image of the original, on a sheet by the combination of the image reading function and the image forming function.

The Scan function is a function for reading an image of an original with the image reading function of the image reading unit 12 to thereby obtain data of the image (image data). The image data obtained by the Scan function may be transmitted to a PC (Personal Computer) from the network communicating unit 17 via the LAN. In a case that the MFP 1 has a USB port, the obtained image data may be stored in a USB memory connected to the USB port.

The Fax function is a function for transmitting/receiving image data via a public telephone line. Specifically, the Fax function includes a transmitting function for transmitting image data, obtained by the image reading function of the image reading unit 12, from the facsimile communicating unit 16 to a destination party (intended recipient) of the facsimile transmission, and a receiving function for forming image data, received by the facsimile communicating unit 16 from a corresponding party (sender of the data) of the facsimile transmission, on a sheet by the image forming function of the image forming unit 11.

<Conversion Data Base>

A conversion DB (data base) 31 (an example of a first storage) is constructed in the non-volatile memory 25 (see FIG. 1) included in the RAM 23. As depicted in FIG. 2, a Card ID (an example of first identification information) of the IC card 2 possessed by a user having authority to use the MFP 1 and a user ID (an example of second identification information) of the user are associated with each other (while being made to correspond to each other) and are registered, as a first record, in the conversion DB 31. Further, the date and time on which the card ID and the user ID are registered in the conversion DB 31, and restriction on the function (function restriction) imposed on a user of the user ID, in other words, a function of which execution is allowed to the user and a function of which execution is restricted to the user are registered in the conversion DB 31 while being associated with each pair of the card ID and the user ID. In FIG. 2, a function of which execution is allowed to the user is designated with "OK", while a function of which execution is restricted to the user is designated with "NG".

In an example depicted in FIG. 2, a card ID "12345", a registration date and time "2016/9/26" and "Copy function" and "Scan function" each as the function of which execution is allowed to a user "1" are registered, while being associated with a user ID "yamada" of the user "1". A card ID "33557", a registration date and time "2016/7/23" and "Copy function" as the function of which execution is allowed to a user "2" are registered, while being associated with a user ID "tanaka" of the user "2". A card ID "12357", a registration date and time "2016/8/5" and "Copy function" as the function of which execution is allowed to a user "3" are registered, while being associated with a user ID "sasaki" of the user "3". A card ID "93571", a registration date and time "2016/8/30" and "Copy function" and "Fax function" each as the function of which execution is allowed to a user "4" are registered, while being associated with a user ID "nakano" of the user "4".

<Deletion Data Base>

A deletion DB 32 (an example of a second storage) is constructed in the non-volatile memory 25, as depicted in FIG. 1. A second record, in which a card ID deleted from the conversion DB 31 and deletion reason information corresponding to the deletion reason for deleting the card ID are associated with each other, is registered in this deletion DB 32, as depicted in FIG. 3.

In an example depicted in FIG. 3, a card ID "26845" and deletion reason information corresponding to a deletion reason "expired" are registered while being associated with each other. Further, a card ID "39751" and deletion reason information corresponding to a deletion reason "expired" are registered while being associated with each other; and a card ID "69574" and deletion reason information corresponding to a deletion reason "no user" are registered while being associated with each other.

Note that in the non-volatile memory 25, a storage capacity allocated to the conversion DB 31 and a storage capacity allocated to the deletion DB 32 are appropriately changed depending on the capacity necessary for each of the conversion DB 31 and the deletion DB 32.

<Authentication Data Base>

As depicted in FIG. 1, an authentication DB 33 is constructed in the server 3. The user ID and a password (an example of third identification information) are registered in this authentication DB 33, as depicted in FIG. 4.

In an example depicted in FIG. 4, the user ID "yamada" and a password "1234" are associated with each other and are registered. Further, the user ID "tanaka" and a password "5678" are associated with each other and are registered; the user ID "sasaki" and a password "9012" are associated with each other and are registered; the user ID "nakano" and a password "3456" are associated with each other and are registered; and the user ID "okada" and a password "7890" are associated with each other and are registered. Furthermore, whether a user of a user ID is currently authorized to use the MFP 1, namely, whether the user ID is valid, is registered in the authentication DB 33, while being associated with each of the user IDs.

<Card Registration Processing>

Figure 5:
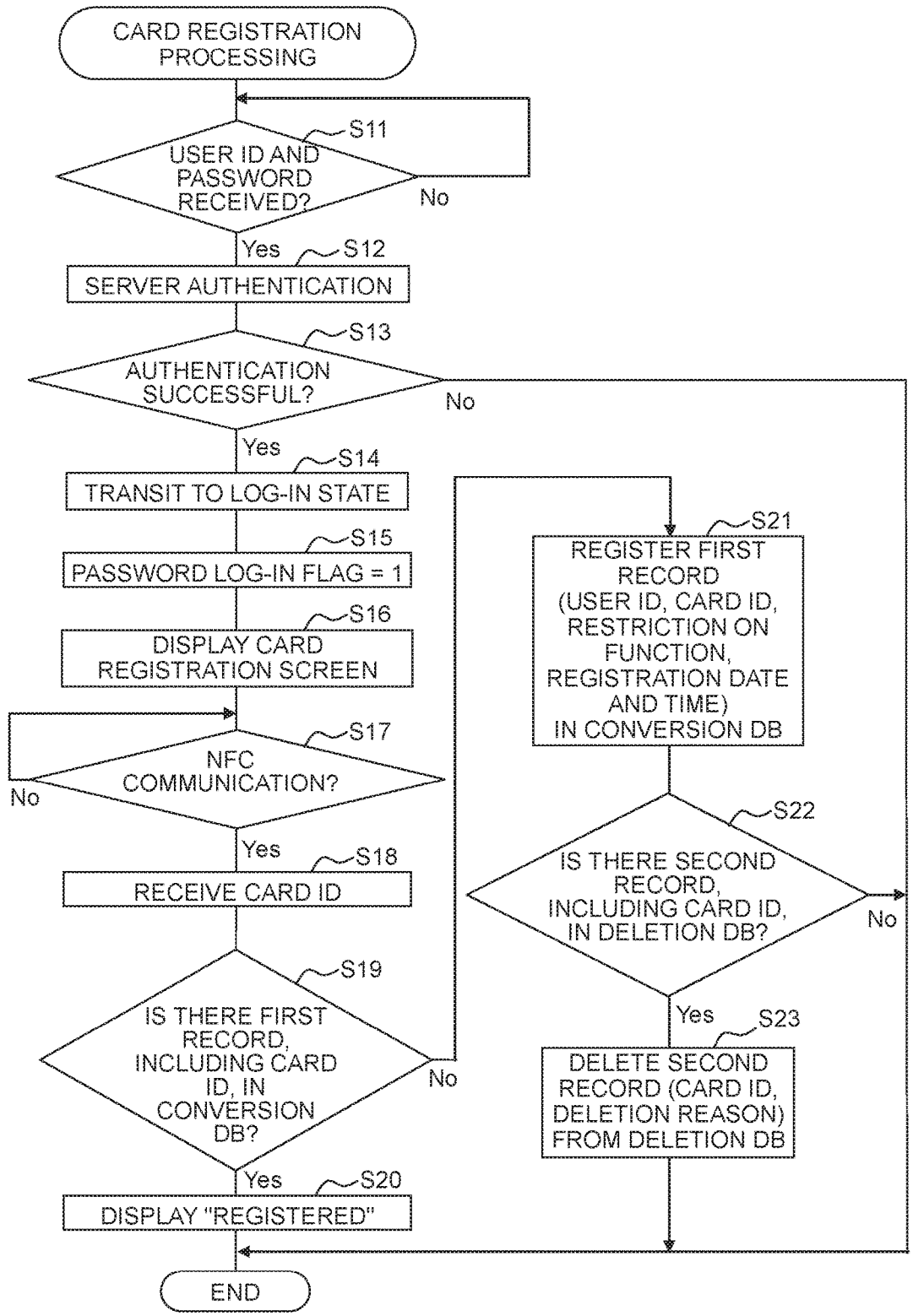
FIG. 5 is a flow chart depicting a card registration processing.

Under a condition that the power is supplied to the MFP 1 and that any of a card log-in processing, a function execution processing, and a regular check processing is not being executed (is not in progress), the CPU 24 executes a card registration processing depicted in FIG. 5.

In the card registration processing, the CPU 24 determines whether a user ID and a password has been received by the operating unit 14 (S11). Until a user ID and a password are received, the determination as to whether a user ID and a password have been received by the operating unit 14 is repeated, and the card registration processing does not progress further.

In a case that the operating unit 14 is operated by the user and the user ID and the password are received by the operating unit 14 (S11: YES), the card registration processing is advanced, and the CPU 24 transmits the user ID and the password from the network communicating unit 17 to the server 3 for the user authentication by the server 3 (server authentication) (S12).

In a case that the server 3 receives the user ID and the password from the MFP 1, the user authentication is performed in the server 3. In the user authentication, it is determined whether the combination of the user ID and the password is registered (stored) in the authentication DB 33. In a case that the combination of the user ID and the password is registered in the authentication DB 33, the user authentication is successful, and a result of successful user authentication (user authentication-success) is transmitted from the server 3 to the MFP 1. On the other hand, in a case that the combination of the user ID and the password is not registered in the authentication DB 33, the user authentication is unsuccessful (failed), and a result of unsuccessful user authentication (user authentication-failure) is transmitted from the server 3 to the MFP 1.

In a case that the network communicating unit 17 receives the result of the successful user authentication from the server 3 (S13: YES), the CPU 24 causes the RAM 23 to store the user ID. Further, the CPU 24 switches the operational mode of the MFP 1 from the first mode to the second mode. With this, a state (log-in state) that the user logs in the MFP 1 is provided (S14). In the second mode, a function, registered in the conversion DB 31 as a function which is associated with the user ID of the logged-in user and which is executable by the logged-in user, is executable by said user.

On the other hand, in a case that the network communicating unit 17 receives the result of the unsuccessful user authentication from the server 3 (S13: NO), the CPU 24 does not cause the RAM 23 to store the user ID corresponding to the card ID, maintains the operational mode in the first mode, and ends the card registration processing. In the first mode, any of the Copy function, Scan function and Fax function is not executable.

After transition to the log-in state in response to the receipt of the result of successful user authentication, the CPU 24 sets "1" in a password log-in flag provided on the RAM 23 (S15).

Further, the CPU 24 causes the display 13 to display a card registration screen for registration of the IC card 2 possessed by the logged-in user (S16). The card registration screen includes a message urging the user to hold the IC card 2 closely to the NFC communicating unit 15.

Then, in a case that the IC card 2 is held closely to the NFC communicating unit 15, and that the NFC communication is performed between the IC card 2 and the NFC communicating unit 15 (S17: YES), the card log-in processing is advanced, and the CPU 24 receives the card ID read from the IC card 2 by the NFC communicating unit 15 (S18).

Then, the CPU 24 determines whether the first record, including the card ID of the IC card 2, is registered in the conversion DB 31 (S19).

In a case that the first record including the card ID of the IC card 2 has been already registered in the conversion DB 31 (S19: YES), the CPU 24 causes the display 13 to display a message "registered" indicating that the card ID has been registered (S20), and ends the card registration processing.

On the other hand, in a case that the first record including the card ID of the IC card 2 has not yet been registered in the conversion DB 31 (S19: NO), the CPU 24 registers, as the first record in the conversion DB 31, the user ID, the card ID of the IC card 2 and the restriction on the function (function restriction) imposed on the user of the user ID which are received at the time of the start of the card registration processing, while making the user ID, the card ID of the IC card 2 and the function restriction imposed on the user of the user ID to be associated with one another, together with information regarding current date and time (registration date and time information) (S21).

Afterwards, the CPU 24 confirms whether the second record including the card ID registered in the conversion DB 31 is registered in the deletion DB 32 (S22).

Further, in a case that the second record including the card ID registered in the conversion DB 31 has been already registered in the deletion DB 32 (S22: YES), the CPU 24 deletes (eliminates, erases) the second record (card ID and the deletion reason information) from the deletion DB 32 (S23), and ends the card registration processing.

In a case that the second record including the card ID registered in the conversion DB 31 has not yet been registered in the deletion DB 32 (S22: NO), the CPU 24 ends the card registration processing, without changing the configuration of the deletion DB 32.

<Card Log-in Processing>

Figure 6A:
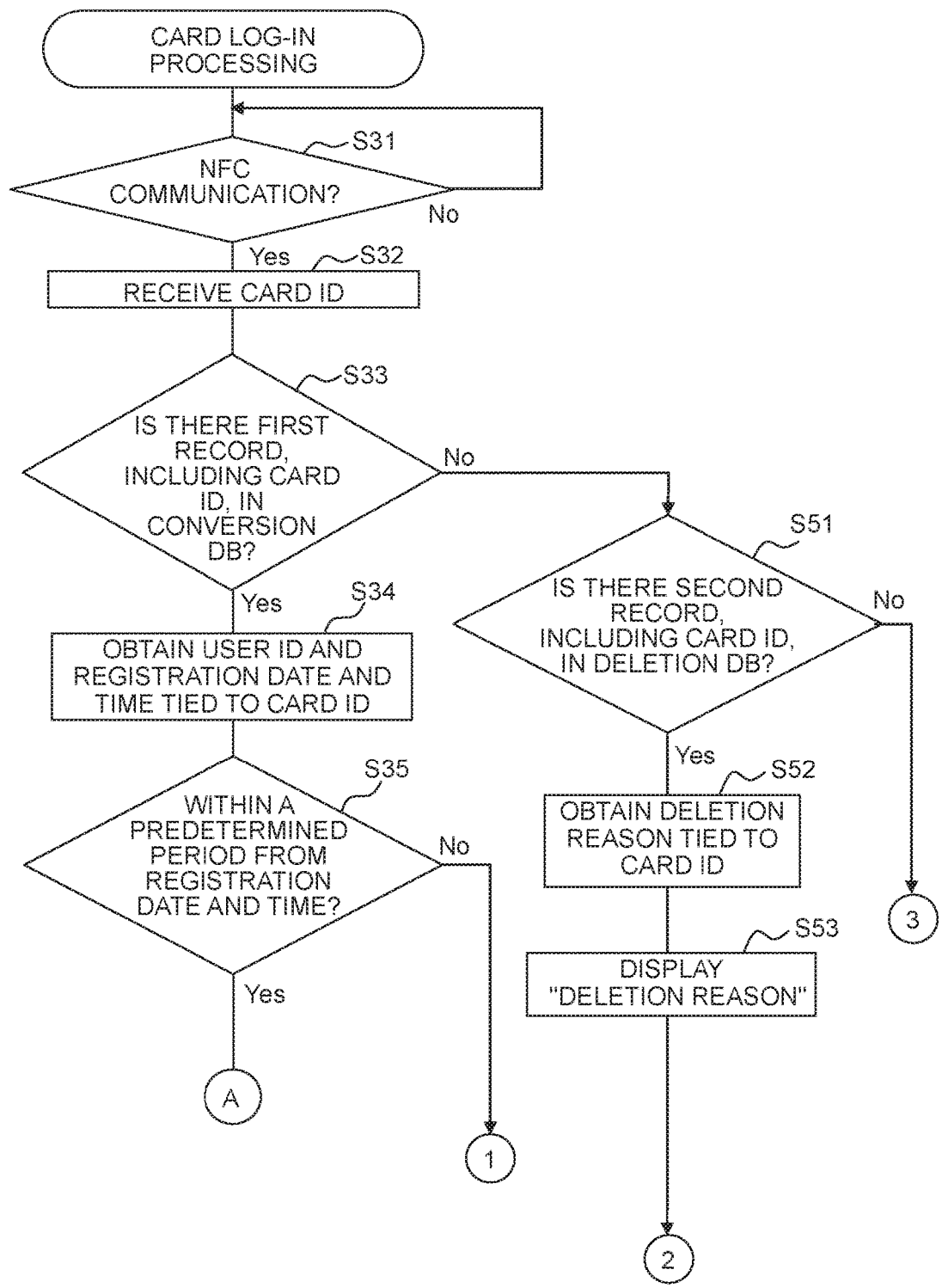
FIGS. 6A to 6C are a flow chart depicting a card log-in processing.
Figure 6B:
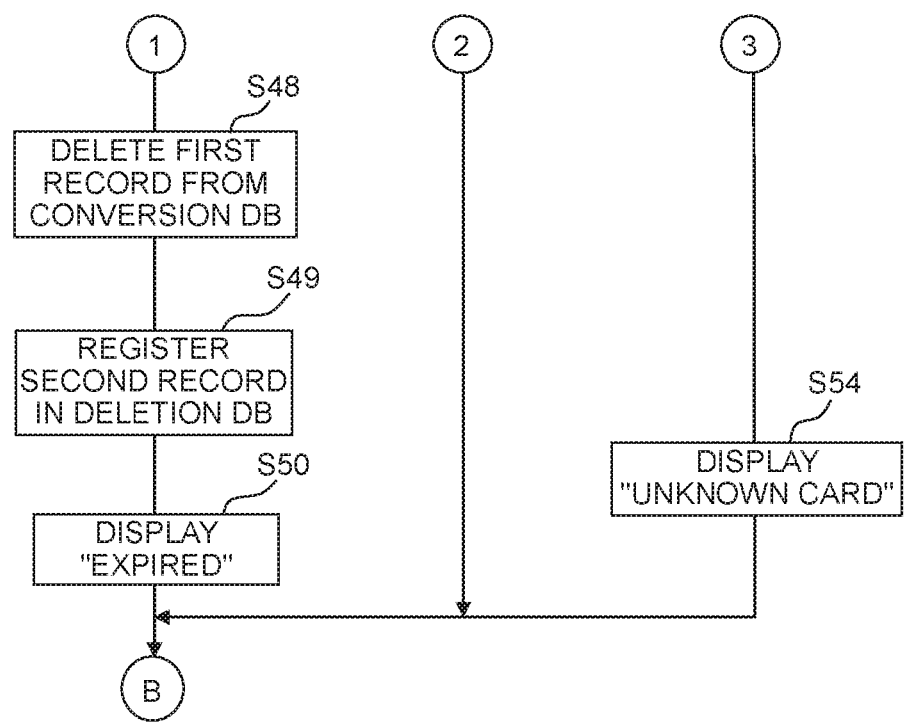
Figure 6C:
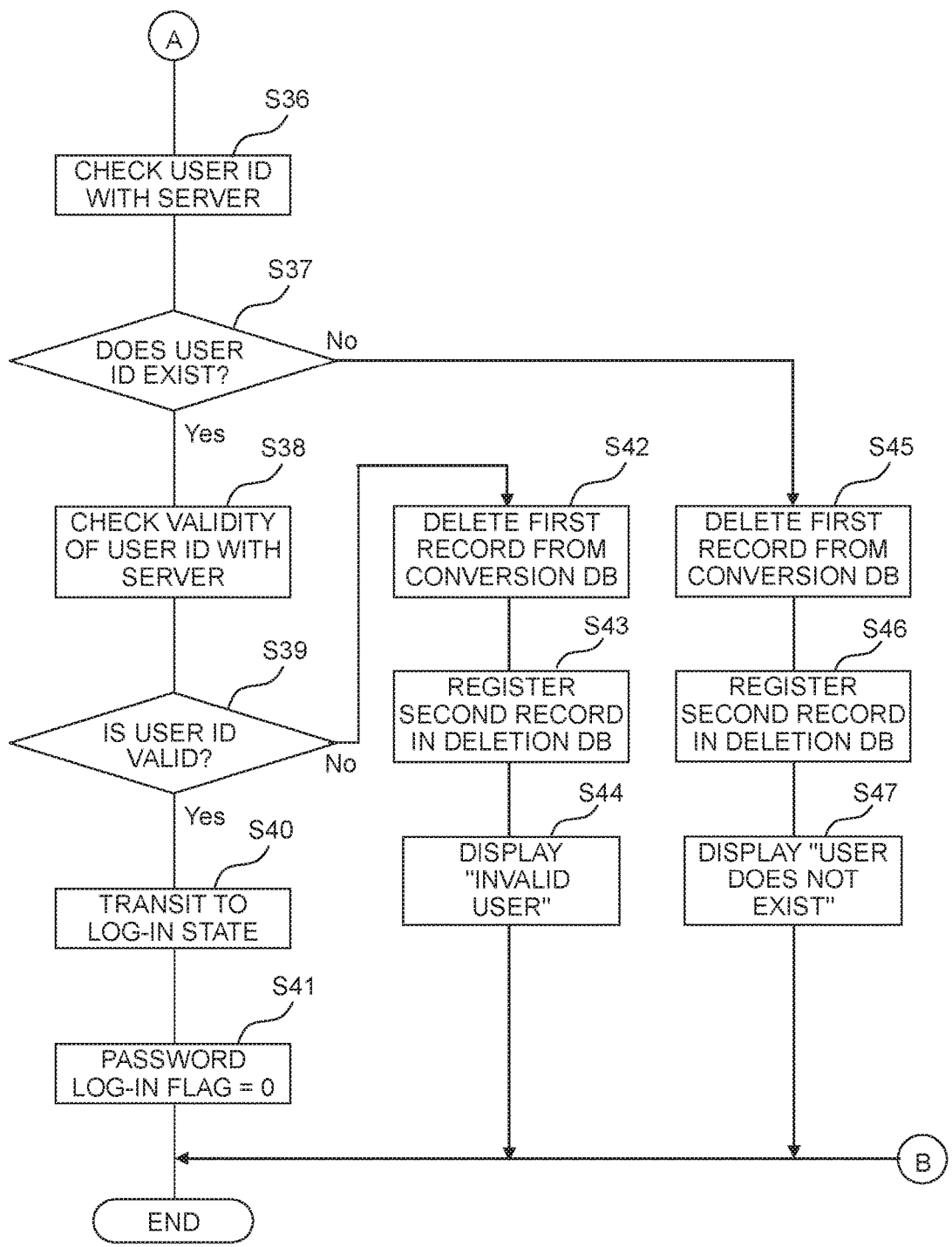

Under a condition that the power is supplied to the MFP 1 and that any of the card registration processing, the function execution processing, and the regular check processing is not being executed, the CPU 24 executes a card log-in processing depicted in FIGS. 6A to 6C.

In the card log-in processing, the CPU 24 determines whether the NFC communication has been performed between the IC card 2 and the NFC communicating unit 15 (S31), as depicted in FIG. 6A. Until the NFC communication is performed, the determination as to whether the NFC communication has been performed is repeated, and the card log-in processing does not progress further.

In a case that the IC card 2 is held closely to the NFC communicating unit 15 and that the NFC communication is performed between the IC card 2 and the NFC communicating unit 15 (S31: YES), the card log-in processing is advanced, and the CPU 24 receives the card ID read from the IC card 2 by the NFC communicating unit 15 (S32).

Afterwards, the CPU 24 determines whether the first record including the card ID of the IC card 2 is registered in the conversion DB 31 (S33).

In a case that the first record including the card ID of the IC card 2 has been registered in the conversion DB 31 (S33: YES), the CPU 24 obtains, from the conversion DB 31, the user ID and the registration date and time information tied to (associated with) the card ID (S34).

Further, the CPU 24 determines whether the registration date and time, corresponding to the obtained registration date and time information, is included within a past predetermined period up to the current date and time (S35).

In a case that the registration date and time is included within the past predetermined period up to the current date and time (S35: YES), the CPU 24 transmits, to the server 3, the user ID from the network communicating unit 17 and performs confirmation, with respect to the server 3, as to whether the user ID exists in the authentication DB 33 (S36), as depicted in FIG. 6C.

With respect to this confirmation, in a case that a response indicating that the user ID exists in the server 3 is received by the network communicating unit 17 from the server 3 (S37: YES), the CPU 24 makes a query, to the server 3, as to whether the user ID is valid (S38: Validity Confirmation).

In a case that the user ID is a user ID of a user currently authorized to use the MFP 1 and that the user ID is valid, a response indicating that the user ID is valid is transmitted from the server 3 to the MFP 1. In a case that the network communicating unit 17 receives the response indicating that the user ID is valid (S39: YES), the CPU 24 switches the operational mode of the MFP 1 from the first mode to the second mode to thereby perform transition from a state that the user does not log in the MFP 1 to a state that the user logs in the MFP 1 (S40).

Afterwards, the CPU 24 sets "0" in the password log-in flag (S41), and ends the card log-in processing.

In a case that the user ID is a user ID of a user currently not authorized to use the MFP 1 and that the user ID is invalid, a response indicating that the user ID is invalid is transmitted from the server 3 to the MFP 1. In a case that the network communicating unit 17 receives the response indicating that the user ID is invalid (S39: NO), the CPU 24 deletes, from the conversion DB 31, the first record including the card ID received at the time of the start of the card log-in processing (S42).

Then, the CPU 24 registers, in the deletion DB 32, a second record in which the card ID deleted from the conversion DB 31 and deletion reason information (information indicating that the user ID is invalid) are included while being associated with each other (S43).

Afterwards, the CPU 24 causes the display 13 to display a message "invalid user" (S44), and ends the card log-in processing.

On the other hand, in a case that a response indicating that the user ID does not exist is received by the network communicating unit 17 from the server 3 (S37: NO), the CPU 24 deletes, from the conversion DB 31, the first record including the card ID received at the time of the start of the card log-in processing (S45).

Then, the CPU 24 registers, in the deletion DB 32, a second record in which the card ID deleted from the conversion DB 31 and deletion reason information (information indicating that the user ID does not exist), are included while being associated with each other (S46).

Then, the CPU 24 causes the display 13 to display a message "user not existing" (S47), and ends the card log-in processing.

Alternatively, in a case that the registration date and time obtained after the start of the card log-in processing is not included in the past predetermined period up to the current date and time (S35: NO), the CPU 24 deletes, from the conversion DB 31, the first record including the card ID received at the time of the start of the card log-in processing (S48), as depicted in FIG. 6B.

Then, the CPU 24 registers, in the deletion DB 32, a second record in which the card ID deleted from the conversion DB 31 and deletion reason information (information indicating that the card ID is expired) are included while being associated with each other (S49).

Then, the CPU 24 causes the display 13 to display a message "expired" (S50), and ends the card log-in processing.

Still alternatively, in a case that the first record including the card ID received at the time of the start of the card log-in processing is not registered in the conversion DB 31 (S33: NO), the CPU 24 confirms whether a second record including the card ID is registered in the deletion DB 32 (S51).

In a case that the second record is registered in the deletion DB 32 (S51: YES), the CPU 24 obtains deletion reason information tied to the card ID from the deletion DB 32 (S52).

Then, the CPU 24 causes the display 13 to display a message indicating the obtained deletion reason information (S53), and ends the card log-in processing.

On the other hand, in a case that the second record including the card ID obtained at the time of the start of the card log-in processing is not registered in the deletion DB 32 (S51: NO), the CPU 24 causes the display 13 to display a message indicating that the IC card 2 is an unknown card (S54), and ends the card log-in processing.

<Function Execution Processing>

Figure 7:
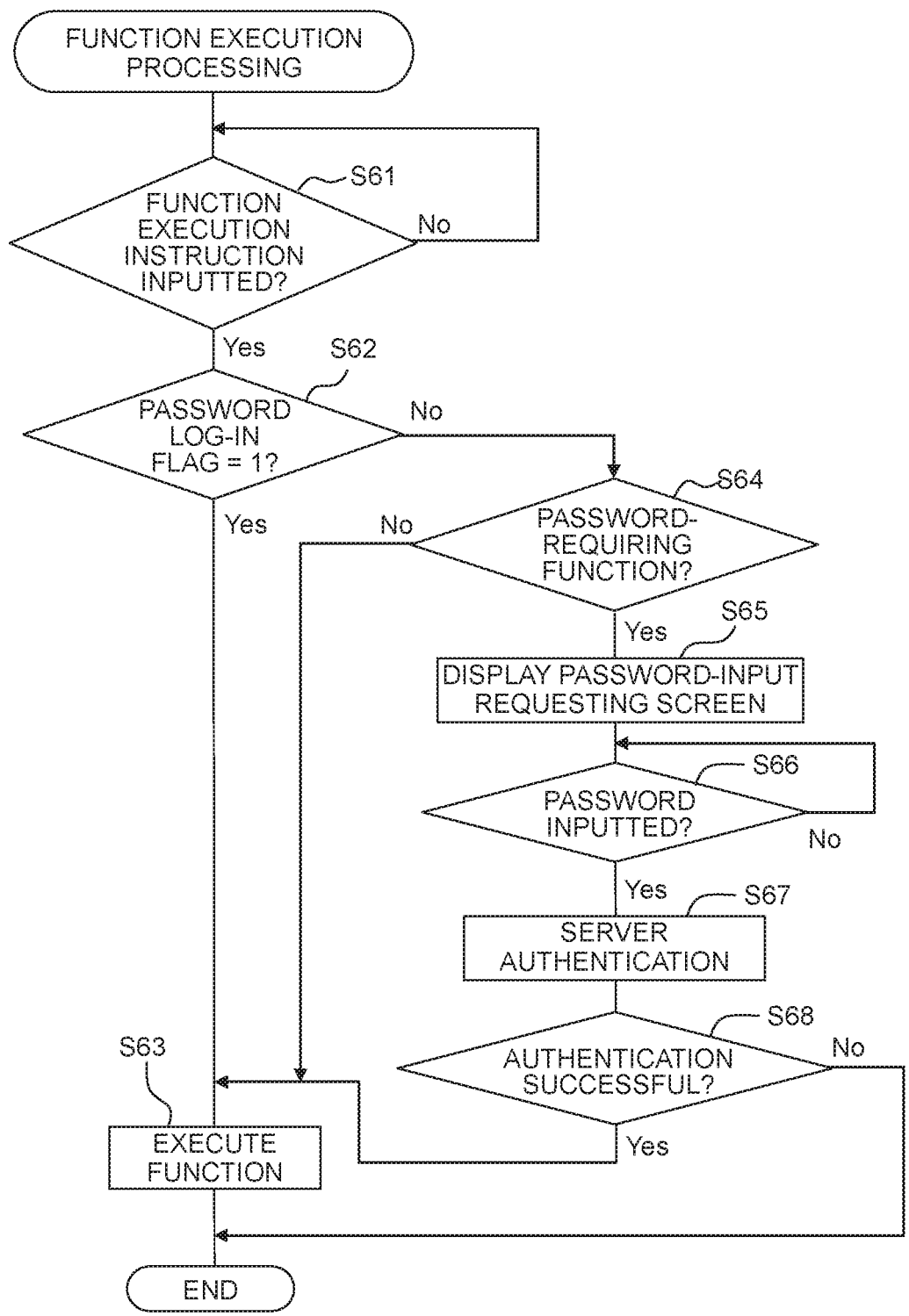
FIG. 7 is a flow chart depicting a function execution processing.

Under a condition that the operational mode of the MFP 1 is the second mode and that any of the card registration processing, the card log-in processing, and the regular check processing is not being executed, the CPU 24 executes a function execution processing depicted in FIG. 7.

In the function execution processing, the CPU 24 determines whether a function execution instruction has been inputted (S61). Until the function execution instruction is inputted, the determination as to whether the function execution instruction has been inputted is repeated, and the function execution processing does not progress further.

The function execution instruction can be received by the operating unit 14 in the log-in state that the user logs in (is logged-in). Specifically, in the log-in state, a function selecting button via which the logged-in user selects a function allowed to the user is displayed in the display 13. For example, in a case that the user is allowed to execute the Copy function and the Scan function, a copy selection button and a scan selection button via which the Copy function and the Scan function are selectable, respectively, are displayed, as the function selection button, in the display 13. Further, an execution instruction button via which the execution of a selected function selected via the function selection button is instructed is displayed in the display 13. After selection of a function by an operation for pressing the function selection button, an operation for pressing the execution instruction button is performed to thereby input a function execution instruction for instructing the execution of the selected function.

In a case that the function execution instruction is inputted (S61: YES), the function execution processing is advanced, and the CPU 24 determines whether "1" is set in the password log-in flag (S62).

In a case that "1" is set in the password log-in flag (S62: YES), namely, in a case that the operating unit 14 is operated and the password is inputted to thereby provide the log-in state, the CPU 24 controls the image forming unit 11, the image reading unit 12, etc., to thereby execute a function as a target function of the function execution instruction, namely to thereby execute the function selected by the function selection button (S63), and ends the function execution processing.

On the other hand, in a case that "0" is set in the password log-in flag (S62: NO), the CPU 24 determines whether the function as the target function of the function execution instruction is a function which requires password input (S64). For example, the Scan function is set as the function not requiring the password input, whereas the Copy function and the Fax function are each set as the function requiring the password input.

In a case that the target function of the function execution instruction is the function not requiring the password input (S64: NO), the CPU 24 executes said function (S63), and ends the function execution processing.

In a case that the target function of the function execution instruction is the function requiring the password input (S64: YES), the CPU 24 causes the display 13 to display a password input requesting screen for requesting the input of the password (S65).

In a case that the password is inputted by the operation of the operating unit 14 in a state that the password input requesting screen is displayed (S66: YES), the CPU 24 transmits the inputted password together with the user ID of the user in the log-in state from the network communicating unit 17 to the server 3, for the user authentication by the server 3 (server authentication) (S67).

In a case that the server 3 receives the user ID and the password from the MFP 1, the server 3 performs the user authentication. In the user authentication, it is determined whether the combination of the user ID and the password has been already registered in the authentication DB 33. Further, in a case that the combination of the user ID and the password is registered in the authentication DB 33, the user authentication is successful, and a result of successful user authentication (user authentication-success) is transmitted from the server 3 to the MFP 1. On the other hand, in a case that the combination of the user ID and the password is not registered in the authentication DB 33, the user authentication is unsuccessful (failed), and a result of unsuccessful user authentication (user authentication-failure) is transmitted from the server 3 to the MFP 1.

In a case that the network communicating unit 17 receives the result of the successful user authentication from the server 3 (S68: YES), the CPU 24 executes the target function of the function execution instruction (S63), and ends the function execution processing.

In a case that the network communicating unit 17 receives the result of the unsuccessful user authentication from the server 3 (S68: NO), the CPU 24 ends the function execution processing, without executing the target function of the function execution instruction (S63 is skipped).

<Regular Check Processing>

Figure 8A:
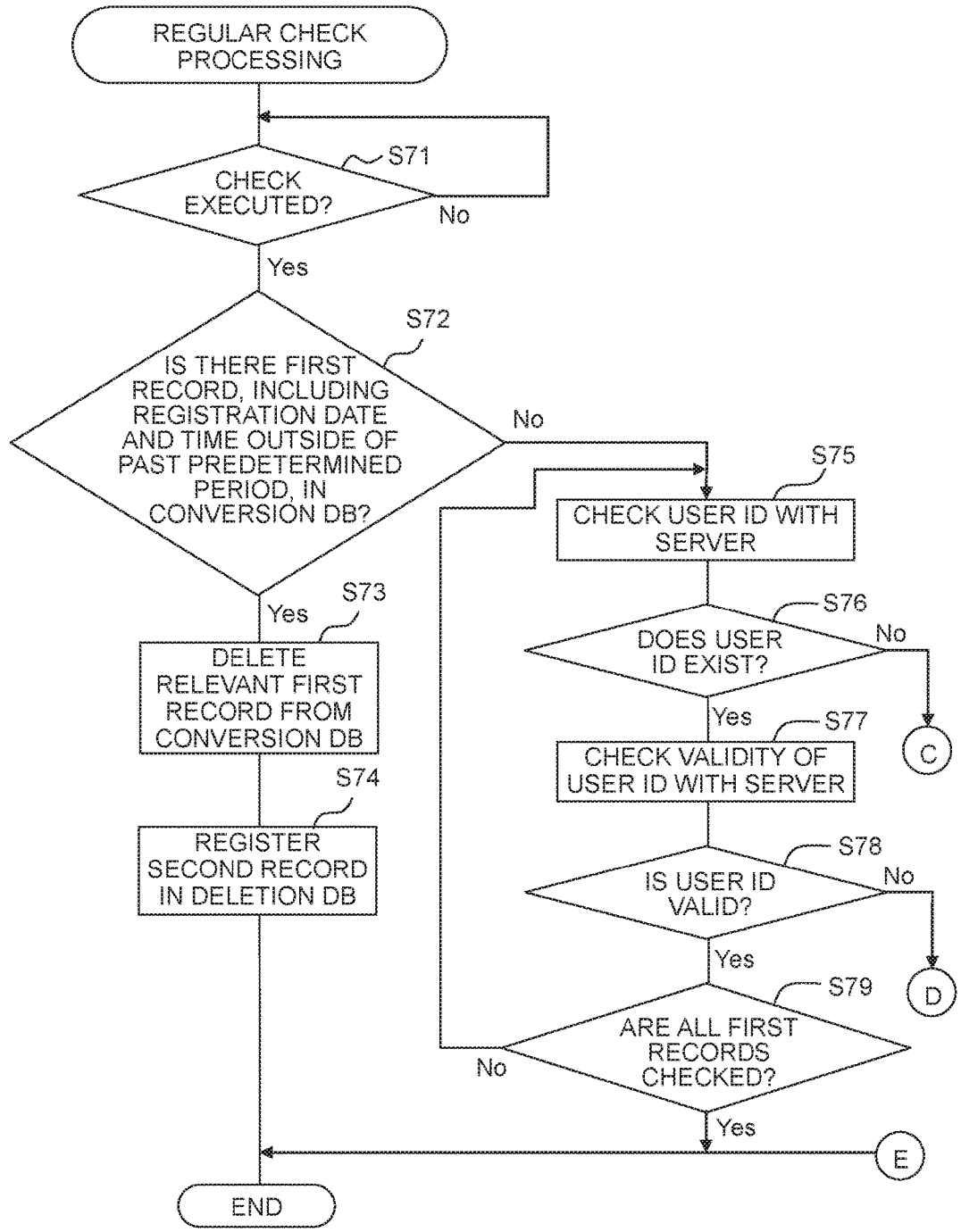
FIGS. 8A and 8B are a flow chart depicting a regular check processing.
Figure 8B:
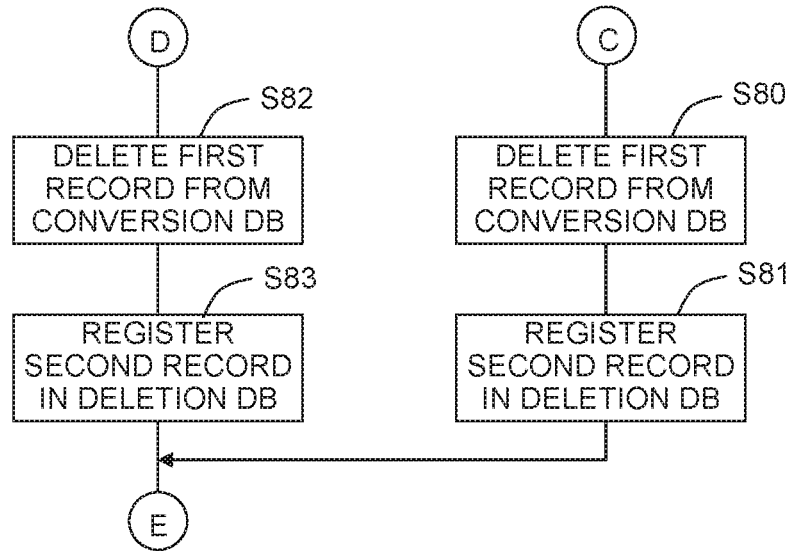

Under a condition that the power is supplied to the MFP 1 and that any of the card registration processing, the card log-in processing, and the function execution processing is not being executed, the CPU 24 executes a regular check processing depicted in FIGS. 8A and 8B. The regular check processing is a processing for regularly (periodically) checking whether a first record which has been expired is registered in the conversion DB 31, namely, whether a first record including the registration date and time information corresponding to a registration date and time outside of a predetermined period from the present and back to the past, and for regularly checking whether a user ID is valid.

In the regular check processing, it is determined whether it is timing to execute the check (S71), as depicted in FIG. 8A. The timing to execute the check arrives under a condition that such a state is provided that a predetermined time elapses since the check has been executed the last time, and that any of the card registration processing, the card log-in processing and the function execution processing is not being in progress (is not being executed). Until the timing to execute the check arrives, the determination as to whether it is the timing to execute the check is repeated, and the regular check processing does not progress further.

In a case that the timing to execute the check arrives (S71: YES), the regular check processing is advanced, and the CPU 24 makes investigation as to whether a first record including the registration date and time information corresponding to a registration date and time outside of the predetermined period from the present and back to the past, namely an expired first record, is registered in the conversion DB 31 (S72).

In a case that the expired first record is registered in the conversion DB 31 (S72: YES), the CPU 24 deletes the expired first record from the conversion DB 31 (S73).

Then, the CPU 24 registers, in the deletion DB 32, a second record in which the deleted card ID deleted from the conversion DB 31 and deletion reason information indicating that the card ID is expired are included while being associated with each other (S74), and ends the regular check processing.

In a case that any expired first record is not registered in the conversion DB 31 (S72: NO), the CPU 24 transmits, to the server 3, the user ID from the network communicating unit 17 and performs confirmation, with respect to the server 3, as to whether the user ID exists in the authentication DB 33 (S75).

With respect to this confirmation, in a case that a response indicating that the user ID exists in the server 3 is received by the network communicating unit 17 from the server 3 (S76: YES), the CPU 24 makes a query, to the server 3, as to whether the user ID is valid (S77: Validity Confirmation).

In a case that the user ID is a user ID of a user currently authorized to use the MFP 1 and that the user ID is valid, a response indicating that the user ID is valid is transmitted from the server 3 to the MFP 1. In a case that the network communicating unit 17 receives the validness response (S78: YES), the CPU 24 determines, with respect all the first records, as to whether the confirmation has been made regarding the existence of the user ID in the authentication DB 33 and the confirmation has been made regarding the validity/invalidity of the user ID in the authentication DB 33 (S79).

In a case that the confirmation has not been made regarding all the first records (S79: NO), the CPU 24 transmits a user ID, which has not yet been confirmed, from the network communicating unit 17 to the serve 3, and makes confirmation as to whether the user ID which has not yet been confirmed exists in the authentication DB 33 (S75).

On the other hand, in a case that a response indicating that the user ID does not exist is received by the network communicating unit 17 from the server 3 (S76: NO), the CPU 24 deletes, from the conversion DB 31, a first record including the user ID which does not exist in the authentication DB 33 of the server 3 (S80), as depicted in FIG. 8B.

Further, the CPU 24 registers, in the deletion DB 32, a second record in which the deleted card ID deleted from the conversion DB 31 and deletion reason information indicating that the user ID does not exist (no user) are included while being associated with each other (S81), and ends the regular check processing.

Alternatively, in a case that the user ID is a user ID of a user currently not authorized to use the MFP 1 and that the user ID is invalid, a response indicating that the user ID is invalid is transmitted from the server 3 to the MFP 1. In a case that the network communicating unit 17 receives the response indicating that the user ID is invalid (S78: NO), the CPU 24 deletes, from the conversion DB 31, the first record including the card ID received at the time of the start of the card log-in processing (S82), as depicted in FIG. 8B.

Then, the CPU 24 registers, in the deletion DB 32, a second record in which the deleted card ID deleted from the conversion DB 31 and deletion reason information indicating that the user ID is invalid are included while being associated with each other (S83), and ends the regular check processing.

<Reset Flag Processing>

Figure 9:
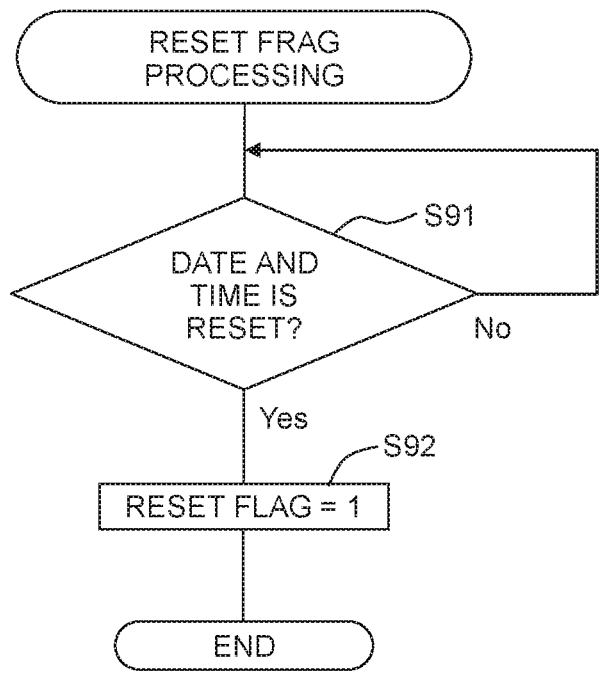
FIG. 9 is a flow chart depicting a reset flag processing.

In a case that the connection between the MFP 1 and an external power source is turned off, for example, such that an attachment plug of the power cable of the MFP 1 is pulled off from the receptacle (socket), the CPU 24 executes a date and time reset processing as depicted in FIG. 9. Under a condition that a state of no-connection between the MFP 1 and the external power source is continued and that the remaining amount of a backup power supply provided on the controller 18 is lowered to be not more than a predetermined amount, information about the current date and time retained in the clock unit 26 is deleted (date and time resetting).

In the date and time reset processing, the CPU 24 determines whether the date and time resetting has been performed by using the power of the backup power supply (S91).

Then, in a case that the date and time resetting has been performed, the CPU 24 set "1" in a reset flag set in the non-volatile memory 25 (S92), and ends the reset flag processing.

<Date and Time Reset Processing>

Figure 10:
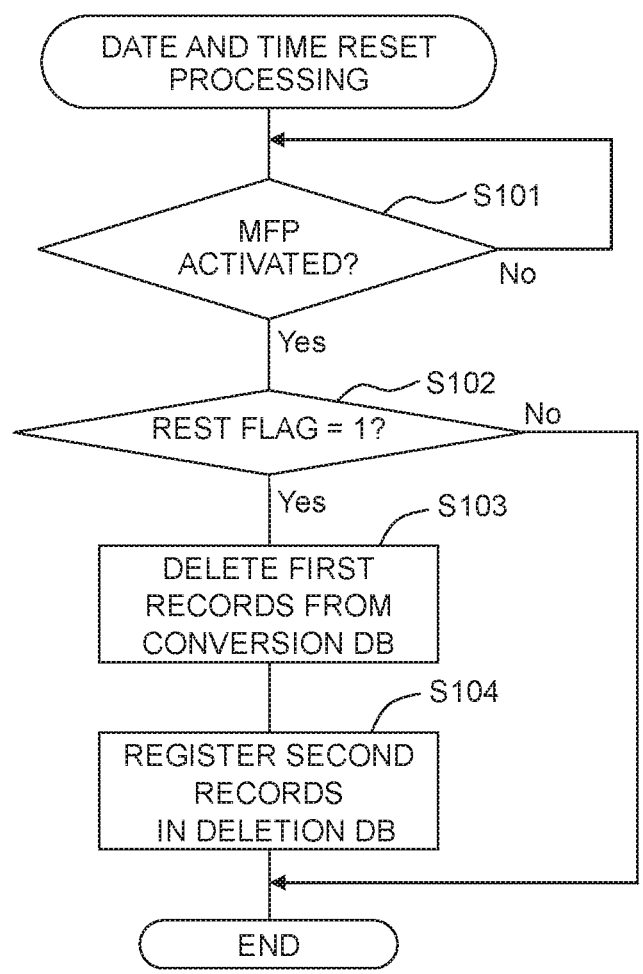
FIG. 10 is a flow chart depicting a date and time reset processing.

In a case that the MFP 1 is connected to the external power source from the state that the MFP 1 is disconnected from the external power source, the CPU 24 executes a date and time reset processing as depicted in FIG. 10.

In the date and time reset processing, the CPU 24 determines whether the MFP 1 has been activated.

In a case that the MFP 1 has been activated (S101: YES), the CPU 24 determines whether "1" is set in the reset flag (S102).

In a case that "I" is set in the reset flag (S102: YES), the CPU 24 delete all of the first records from the conversion DB 31 (S103).

Then, the CPU 24 registers, in the deletion DB 32, a second record in which the card ID included in each of all the deleted first records and deletion reason information indicating that the IC card 2 is unknown are associated with each other (S104), and ends the date and time reset processing.

As described above, under a condition that the operational mode of the MFP 1 is the first mode and that the operating unit 14 receives the user ID and the password, the user ID and the password are transmitted from the network communicating unit 17 to the server 3. In the server 3, the authentication, as to whether the combination of the user ID and the password transmitted from the network communicating unit 17 is registered in the authentication DB 33, is performed.

In a case that a response received by the network communicating unit 17 from the server 3, in response to the transmittance of the user ID and the password, is the authentication-success response, the CPU 24 switches the operational mode of the MFP 1 from the first mode to the second mode. As a result, a function using an image data becomes executable. In a case that a response received by the network communicating unit 17 from the server 3 is the authentication-failure response, the CPU 24 maintains the operational mode in the first mode, without switching the first mode to the second mode. Accordingly, none of the functions using the image data become to be executable.

Under a condition that the operational mode of the MFP 1 is the second mode, that the IC card 2 is moved closely to be in the predetermined distance from the NFC communicating unit 15 and that the card ID is received from the IC card 2 by the NFC communicating unit 15, the CPU 24 determines whether the first record, including the card ID, is registered in the conversion DB 31. In a case that the first record including the card ID is registered in the conversion DB 31, an image indicating that the card ID has been registered, namely, a message "registered", is displayed in the display 13. In a case that the first record including the card ID is not registered in the conversion DB 31, the CPU 24 registers, in the conversion DB 31, a first record, in which the card ID and the user ID which has been previously received by the operating unit 14 are included while being associated with each other.

Further, under a condition that the operational mode of the MFP 1 is the first mode, that the IC card 2 is moved closely to be in the predetermined distance from the NFC communicating unit 15 and that the card ID is received from the IC card 2 by the NFC communicating unit 15, the CPU 24 determines whether the first record, including the card ID, is registered in the conversion DB 31. In a case that the first record including the card ID is registered in the conversion DB 31, the user ID associated with the card ID is obtained from the first record, and the user ID is transmitted from the network communicating unit 17 to the server 3. In the server 3, it is investigated whether the user ID exists. In a case that a response, received by the network communicating unit 17 from the server 3 in response to the transmittance of the user ID, is the response indicating that the user ID exists, a query as to whether the user ID is valid is transmitted to the server 3. Then, in a case that a response indicating that the user ID is valid is received from the server 3, the operational mode of the MFP 1 is switched from the first mode to the second mode. As a result, a function using an image data becomes to be executable.

On the other hand, in a case that the response indicating that the user ID does not exist or the response indicating that the user ID is invalid is received from the server 3, the operational mode of the MFP 1 is maintained in the first mode, without being switched from the first mode. Accordingly, it is not possible to execute a function using image data. Further, also in a case that the first record including the card ID received by the NFC communicating unit 15 from the IC card 2 is not stored by the conversion DB 31, the operational mode is maintained in the first mode, without the first mode being switched to the second mode. Accordingly, it is not possible to execute the function for using the image data.

Namely, under a condition that the operational mode of the MFP 1 is the first mode, and that the user ID and the password registered in the authentication DB 33 of the server 3 are received by the operation unit 14, or the card ID included in the first record registered in the conversion DB 31 of the MFP 1 is received from the IC card 2 by the NFC communicating unit 15, the operational mode is switched from the first mode to the second mode, and a function using an image data becomes executable. On the other hand, under a condition that the operational mode of the MFP 1 is the first mode, and that the user ID and the password which are not stored by the authentication DB 33 of the server 3 are received by the operating unit 14 or that the card ID received by the NFC communicating unit 15 from the IC card 2 does not exist in the server 3 or is invalid or that the first record including the card ID received from the IC card 2 by the NFC communicating unit 15 is not registered in the conversion DB 31 of the MFP 1, the operational mode is maintained in the first mode, without being switched from the first mode, and thus a function using an image data does not become to be executable.

Further, the first record including the card ID and the user ID is registered in the conversion DB 31, and this first record does not include the password which is necessary for the authentication in the server 3. As a result, even in a case, for example, that the first record registered by the conversion DB 31 cannot be deleted due to, for example, any malfunction of the MFP 1, it is possible to eliminate such a concern that the password required for the authentication in the server 3 might be leaked to any third party.

Accordingly, it is possible to prevent the occurrence of such a situation that all pieces of the identification information, required for the authentication in the server 3, namely, both of the user ID and the password, are retained in the inside of the MFP 1 in a case that the MFP 1 suffers from any malfunction, while restricting the user capable of executing the function using image data. Accordingly, it is possible to eliminate such a concern that the password required for the authentication by the server 3 might be leaked to any third party.

Further, the deletion DB 32 is provided on the MFP 1; in the deletion DB 32, the second record, in which the card ID deleted from the conversion DB 31 after once having been registered in (by) the conversion DB 31 and the deletion reason information indicating the deletion reason of the card ID are included while being associated with each other, is registered. Following the reception of the user ID and the password, in a case that the first record, including the card ID received by the NFC communicating unit 15 from the IC card 2, is not registered in the conversion DB 31, it is determined whether the second record including the card ID is registered in the deletion DB 32. Furthermore, in a case that the second record is registered in the deletion DB 32, said second record is deleted from the deletion DB 32; in a case that the second record is not registered in the deletion DB 32, the content of the registration in the deletion DB 32 is not changed.

Also in a case that the NFC communicating unit 15 receives the card ID from the IC card 2, without receiving the user ID and the password, it is determined whether the first record including the card ID is registered in the conversion DB 31. In a case that the first record is not registered in the conversion DB 31, it is further determined whether the second record including the card ID received from the IC card 2 is registered in the deletion DB 32. Further, in a case that the second record is registered in the deletion DB 32, an image indicating the deletion reason information included in the second record is displayed in the display 13. On the other hand, in a case that the second record is not registered in the deletion DB 32, an image indicating that the IC card 2 is unknown is displayed in the display 13.

The RAM 23 of the MFP 1 is provided with the clock unit 26 which is configured to retain the information regarding the current date and time. When the first record is (being) registered in the conversion DB 31, the first record including the registration date and time information, corresponding to the date and time on which the first record is registered in the conversion DB 31, is registered in the conversion DB 31. Further, in a case that the card ID is received by the NFC communicating unit 15 from the IC card 2, without receiving the user ID and the password, the user ID and the registration date and time information are obtained from the first record including the card ID, and it is determined whether the registration date and time corresponding to the registration date and time information is within the past predetermined period up to the current date and time.

In a case that the registration date and time is not within the past predetermined period up to the current date and time, the second record in which the card ID and the deletion reason information indicating that the card ID is expired are included while being associated with each other is registered in the deletion DB 32. Further, an image corresponding to the deletion reason information, namely, a message "expired" is displayed in the display 13.

In a case that the operational mode of the MFP 1 is not switched from the first mode to the second mode (that the user cannot log in the MFP 1) even though a user holds the IC card 2 closely to the NFC communicating unit 15, the image corresponding to the deletion reason information is displayed in the display 13; this allows the user to know the reason for the above-described situation.

Further, the regular check processing is executed in the MFP 1. By executing the regular check processing, it is confirmed, at a predetermined cycle or interval, whether a first record, including the registration date and time information corresponding to a registration date and time outside of a predetermined period from the present and back to the past, namely an expired first record, is registered in the conversion DB 31. In a case that an expired first record is found, said first record is deleted from the conversion DB 31; and a second record, in which the card ID registered relating to the deleted first record and the deletion reason information indicating that the user ID is expired are included while being associated with each other, is registered in the deletion DB 32.

In a case that any expired first record is not found in the conversion DB 31, the user IDs registered in the conversion DB 31 are transmitted to the server 3; in the server 3, it is confirmed as to whether each of the user IDs is registered (exists) in the authentication DB 33 and as to whether each of the user IDs is valid/invalid. Further, in a case that the network communicating unit 17 receives, from the server 3, the non-existence response or the invalid response regarding an user ID (a response indicating that the user ID does not exist or a response indicating that the user ID is invalid), then a first record including such a non-existing or invalid user ID is deleted from the conversion DB 31, and a second record in which the deleted user ID and the deletion reason information are included while being associated with each other is registered in the deletion DB 32.

As described above, in a case that the first record is expired, and that the user ID does not exist in the authentication DB 33 of the server 3 or that the user ID is invalid, the first record corresponding to any of the above-described situation is deleted from the conversion DB 31. Accordingly, it is possible to suppress the occurrence of such a situation that any unnecessary first record is remained to be registered in the conversion DB 31, and to increase an available free space (available capacity) in the non-volatile memory 25.

Further, in a case that the date and time information retained by the clock unit 26 is reset to an initial value, all the first records registered in the conversion DB 31 are deleted. Then, second records, in each of which the card ID included in one of the deleted first records and the deletion reason information indicating that the IC card 2 is unknown are included while being associated with each other, are registered in the deletion DB 32. With this, in a case that such a state that the connection between the MFP 1 and the external power source is turned off is continued, all the first records are deleted. Accordingly, it is possible to provide the user the reason why the first records have been deleted, while making it possible to further prevent any leakage of the information, required for the authentication in the server 3, to the outside.

In the non-volatile memory 25, the storage capacity allocated to the conversion DB 31 and the storage capacity allocated to the deletion DB 32 are appropriately changed depending on the capacity necessary for each of the conversion DB 31 and the deletion DB 32. Accordingly, it is possible to efficiently use the limited storage capacity of the non-volatile memory 25 for the conversion DB 31 and the deletion DB 32.

<Another Example of Date and Time Reset Processing>

Figure 11:
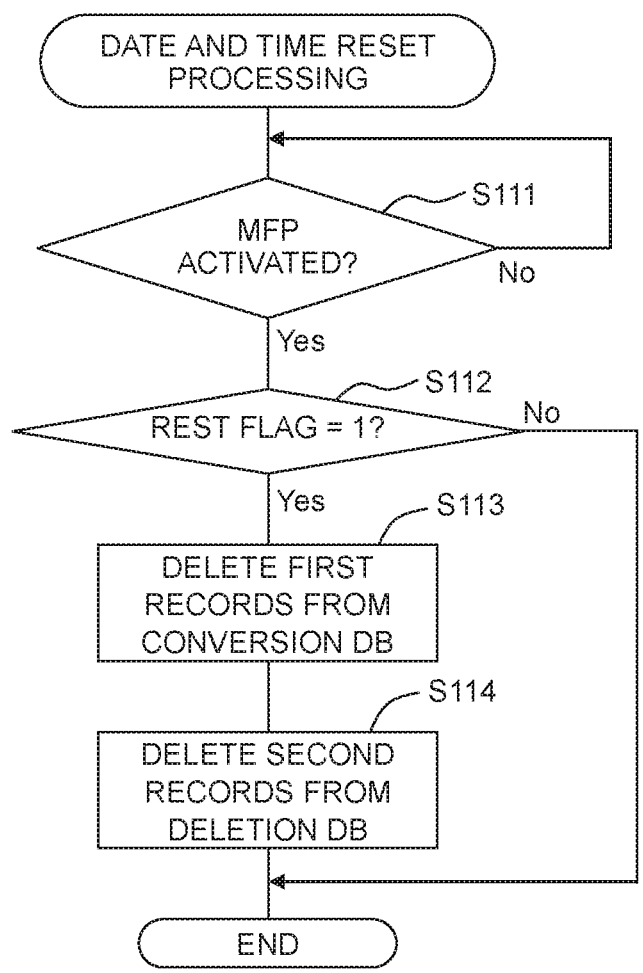
FIG. 11 is a flow chart depicting a modification of the date and time reset processing.

Under a condition that the MFP 1 is connected to the external power source, from the state that the MFP 1 is not connected to the external power source, the CPU 24 may execute a date and time reset processing depicted in FIG. 11, instead of executing the date and time reset processing depicted in FIG. 10.

In the date and time reset processing depicted in FIG. 11, the CPU 24 determines whether the MFP 1 is activated (S111).

Under a condition that the MFP 1 is activated (S111: YES), the CPU 24 determines whether "1" is set in the reset flag (S112).

Under a condition that "1" is set in the reset flag (S112: YES) the CPU 24 deletes all the first records from the conversion DB 31 (S113).

Further, the CPU 24 deletes all the second records form the deletion DB 32 (S114), and ends the date and time reset processing.

In this date and time reset processing, in a case that such a state that the connection between the MFP 1 and the external power source is turned off is continued, not only all the first records, but also all the second records are deleted. Accordingly, it is possible to enhance the security further than in the date and time reset processing depicted in FIG. 10.

<Modification>

Although the embodiment of the present teaching has been explained above, the present teaching may be implemented further in another embodiment, as well.

For example, in the above-described embodiment, the IC card 2 is described as an example of the external terminal. The external terminal, however, is not limited to the IC card 2, provided that the external terminal is capable of performing the NFC communication with the NFC communicating unit 15; the external terminal may be a mobile phone (cellular phone) provided with a memory storing an ID peculiar thereto, etc.

Further, in the above-described embodiment, the explanation has been given about the case wherein the CPU 24 executes each processing. It is allowable, however, that the ACIS 21 is provided with a plurality of CPUs, and that the plurality of CPUs cooperate to execute each processing.

Furthermore, other than those described above, it is possible to make a variety of changes in the design in the above-described configuration within the range of the matters described in the claims.

What is claimed is:

1. An image processing apparatus comprising:
   an image processing device configured to process image data;
   a wireless communication device configured to wirelessly communicate with an external terminal, and to receive first identification information from the external terminal, the external terminal being present at a predetermined distance from the wireless communication device;
   a first database configured to store a first record, the first record including the first identification information and second identification information while being associated with each other;
   an input device configured to receive the second identification information and third identification information;
   a network communication device configured to communicate with a server, the server storing the second identification information and the third identification information while being associated with each other;
   a display;
   a processor; and
   a memory storing instructions, the instructions, when executed by the processor, causing the processor to switch an operational mode of the image processing apparatus between a first mode where the image processing apparatus is in a standby mode, and a second mode where the image processing device is executable,
   wherein the processor is configured to execute the instructions to execute a first authentication process, an external terminal registration process, and a second authentication process, the first authentication process comprising:
      under a condition that the operational mode is the first mode, and the input device receives the second identification information and the third identification information, the processor is configured to transmit, from the network communication device to the server, a combination of the second identification information and the third identification information received by the input device,
      under a condition that the network communication device receives, from the server, an authentication-success response indicating that the combination is stored in the server, the processor is configured to switch the operational mode from the first mode to the second mode, and
      under a condition that the network communication device receives, from the server, an authentication-failure response indicating that the combination is not stored in the server, the processor is configured to maintain the operational mode in the first mode;
   the external terminal registration process comprising:
      under a condition that the operational mode is the second mode and that the wireless communication device receives the first identification information from the external terminal, the processor is configured to determine whether the first record, which includes the first identification information received from the external terminal, is stored in the first database,
      under a condition that the first record including the first identification information received from the external terminal is stored in the first database, the processor is configured to cause the display to display an image indicating that the first identification information is stored in the first database, and
      under a condition that the first record including the first identification information received from the external terminal is not stored in the first database, the processor is configured to cause the first database to store the first record including the second identification information received by the input device and the first identification information received from the external terminal while being associated with each other; and
   the second authentication process comprising:
      under a condition that the operational mode is the first mode and that the wireless communication device receives the first identification information from the external terminal, the processor is configured to determine whether the first record including the first identification information received from the external terminal is stored in the first database,
      under a condition that the first record including the first identification information received from the external terminal is stored in the first database, the processor is configured to obtain the second identification information from the first record including the first identification information received from the external terminal, and to transmit the obtained second identification information to the server,
      under a condition that the network communication device receives, from the server, an existence response indicating that the second identification information is stored in the server, the processor is configured to switch the operational mode from the first mode to the second mode, and
      under a condition that the network communication device receives, from the server, a non-existence response indicating that the second identification information is not stored in the server, the processor is configured to maintain the operational mode in the first mode, and
      under a condition that the first record including the first identification information received from the external terminal is not stored in the first database, the processor is configured to maintain the operational mode in the first mode.

2. The image processing apparatus according to claim 1, further comprising a second database configured to store a second record, the second record including the first identification information deleted after having been stored once in the first database and deletion reason information indicating deletion reason for deleting the first identification information while being associated with each other, wherein the external terminal registration process comprises:
   under the condition that the first record including the first identification information received from the external terminal is not stored in the first database, the processor is configured to further determine whether the second record including the first identification information received from the external terminal is stored in the second database, under a condition that the second record including the first identification information received from the external terminal is stored in the second database, the processor is configured to delete the second record including the first identification information received from the external terminal, from the second database, and under a condition that the second record including the first identification information received from the external terminal is not stored in the second database, the processor is configured not to change contents stored in the second database.

3. The image processing apparatus according to claim 2, wherein the first database and the second database are allocated within a same memory; and a storage capacity allocated to the first database and a storage capacity allocated to the second database in the memory are changeable by the processor.

4. The image processing apparatus according to claim 1, further comprising a second database configured to store a second record, the second record including the second identification information deleted after having been stored once in the first database and deletion reason information indicating deletion reason for deleting the second identification information while being associated with each other, wherein the second authentication process comprises:

under the condition that the first record including the first identification information received from the external terminal is not stored in the first database, the processor is configured to further determine whether the second record including the first identification information received from the external terminal, is stored in the second database, under a condition that the second record including the first identification information received from the external terminal is stored in the second database, the processor is configured to cause the display to display an image corresponding to the deletion reason information included in the second record, and under a condition that the second record including the first identification information received from the external terminal is not stored in the second database, the processor is configured to cause the display to display an image indicating that the external terminal is unknown.

5. The image processing apparatus according to claim 4, further comprising a timer configured to retain date and time information, wherein in a case that the processor causes the first database to store the first record, the processor is configured to cause the first database to store the first record while including, in the first record, recording date and time information indicating a date and time on which the first record is stored in the first database; and the second authentication process comprises:

under the condition that the first record including the first identification information received from the external terminal is stored in the first database, the processor is further configured to obtain, from the first record including the first identification information received from the external terminal, the second identification information and the recording date and time information, and to determine whether the recording date and time information indicates a past date and time within a predetermined period from current date and time information retained in the timer, under a condition that the recording date and time information indicates the past date and time within the predetermined period from the current date and time information, the processor is configured to cause the network communication device to transmit the second identification information to the server, and under a condition that the recording date and time information does not indicate the past date and time within the predetermined period from the current date and time information, the processor is configured to delete, from the first database, the first record including the first identification information received from the external terminal, and to cause the second database to store the second record including the first identification information received from the external terminal and deletion information indicating that the recording date and time information does not indicate the past date and time within the predetermined period from the current date and time information while being associated with each other.

6. The image processing apparatus according to claim 1, further comprising a timer configured to retain date and time information, wherein in a case that the processor causes the first database to store the first record, the processor is configured to cause the first database to store the first record while including, in the first record, recording date and time information indicating a date and time on which the first record is stored in the first database; and the second authentication process comprises:

under the condition that the first record including the first identification information received from the external terminal is stored in the first database, the processor is further configured to obtain, from the first record including the first identification information received from the external terminal, the second identification information and the recording date and time information, and to determine whether the recording date and time information indicates a past date and time within a predetermined period from current date and time information retained in the timer, under a condition that the recording date and time information indicates the past date and time within the predetermined period from the current date and time information, the processor is configure to cause the network communication device to transmit the second identification information to the server, and under a condition that the recording date and time information does not indicate the past date and time within the predetermined period from the current date and time information, the processor is configured to delete, from the first database, the first record including the first identification information received from the external terminal, and to cause the display to display an image indicating that the recording date and time information does not indicate the past date and time within the predetermined period from the current date and time information.

7. The image processing apparatus according to claim 6, further comprising a second database configured to store a second record, the second record including the second identification information deleted after having been stored once in the first database and deletion reason information indicating deletion reason for deleting the second identification information while being associated with each other;

wherein the first record is included in a plurality of first records; and wherein the processor is configured to execute a regular check process that comprises:

confirm whether a certain first record exists among the plurality of first records stored in the first database, at a predetermined cycle, the certain first record including the recording date and time information not indicating the past date and time within the predetermined period from the current date and time information, under a condition that the certain first record including the recording date and time information not indicating the past date and time within the predetermined period from the current date and time information exists among the plurality of first records, the processor is configured to delete the certain first record from the first database, and to cause the second database to store the second record including the first identification information included in the deleted certain first record and deletion reason information indicating that the recording date and time information does not indicate the past date and time within the predetermined period from the current date and time information while being associated with each other, and under a condition that the certain first record including the recording date and time information not indicating the past date and time within the predetermined period from the current date and time information does not exist among the plurality of first records, the processor is configured to obtain the second identification information from the first record stored in the first database and to transmit the obtained second identification information to the server, under a condition that the network communication device receives, from the server, an existence response indicating that the second identification information is stored in the server, the processor is configure to cause the network communication device to transmit, to the server, a query as to whether the second identification information is valid, under a condition that the network communication device receives, from the server, a valid response indicating that the second identification information is valid, the processor is configured not to change contents stored in each of the first database and the second database, under a condition that the network communication device receives, from the server, an invalid response indicating that the second identification information is invalid, the processor is configured to delete, from the first database, the first record including the second identification information transmitted to the server, and to cause the second database to store the second record including the deleted second identification information and deletion information indicating that the second identification information is invalid while being associated with each other, and under a condition that the network communication device receives, from the server, a non-existence response indicating that the second identification information is not stored in the server, the processor is configured to delete, from the first database, the first record including the second identification information transmitted to the server, and to cause the second database to store the second record including the deleted second identification information and deletion information indicating that the second identification information does not exist in the server while being associated with each other.

8. The image processing apparatus according to claim 6, further comprising a second database configured to store a second record, the second record including the second identification information deleted after having been stored once in the first database and deletion reason information indicating deletion reason for deleting the second identification information while being associated with each other;

wherein the timer includes a reset flag indicating whether the date and time information retained by the timer is reset to an initial value;

the processor is configured to further execute a date and time reset processing;

the first record is included in a plurality of first records and the second record is included in a plurality of second records; and in the date and time reset processing, the processor is configured to determine whether the reset flag has value indicating that the reset flag has been reset, under a condition that the reset flag has the value indicating that the reset flag has been reset, the processor is configured to delete all the plurality of first records stored in the first database, and to store, in the second database, the plurality of second records each including the first identification information included in one of the deleted plurality of first records and deletion reason information indicating that the external terminal is unknown while being associated with each other, and under a condition that the reset flag does not have the value indicating that the reset flag has been reset, the processor is configure not to change contents stored in the first database.

9. The image processing apparatus according to claim 6, further comprising a second database configured to store a second record, the second record including the second identification information deleted after having been stored once in the first database and deletion reason information indicating deletion reason for deleting the second identification information while being associated with each other;

wherein the timer includes a reset flag indicating whether the date and time information retained by the timer is reset to an initial value;

the processor is configured to further execute a date and time reset processing;

the first record is included in a plurality of first records and the second record is included in a plurality of second records; and in the date and time reset processing, the processor is configured to determine whether the reset flag has a value indicating that the reset flag has been reset, under a condition that the reset flag has the value indicating that the reset flag has been reset, the processor is configured to delete all the plurality of first records stored in the first database and all the plurality of second records stored in the second database, and under a condition that the reset flag does not have the value indicating that the reset flag has been reset, the processor being configured not to change contents stored in each of the first database and the second database.

10. The image processing apparatus according to claim 1, wherein the second authentication process comprises:

under the condition that the network communication device receives, from the server, the existence response, the processor is further configured to cause the network communication device to transmit, to the server, a query as to whether the second identification information is valid, under a condition that the network communication device receives, from the server, a valid response indicating that the second identification information is valid, the processor is configured to switch the operational mode from the first mode to the second mode, and under a condition that the network communication device receives, from the server, an invalid response indicating that the second identification information is invalid, the processor is configured to maintain the operational mode in the first mode.

11. An information management method executable by an image processing apparatus provided with: an image processing device configured to process image data; a wireless communication device configured to wirelessly communicate with an external terminal, and to receive first identification information from the external terminal, the external terminal being present at a predetermined distance from the wireless communication device; a first database configured to store a first record, the first record including the first identification information and second identification information while being associated with each other; an input device configured to receive the second identification information and third identification information; a network communication device configured to communicate with a server, the server storing the second identification information and the third identification information while being associated with each other; a display; and a processor, the method comprising:

causing the processor to switch an operational mode of the image processing apparatus between a first mode for causing the image processing apparatus to standby, and a second mode in which a processing by the image processing device is executable, wherein the method further includes causing the processor to execute a first authentication processing, an external terminal registration processing, and a second authentication processing, the first authentication processing includes:
under a condition that the operational mode is the first mode and that the input device receives the second identification information and the third identification information, transmitting a combination of the second identification information and the third identification information received by the input device from the network communication device to the server, under a condition that the network communication device receives, from the server, an authentication-success response indicating that the combination is stored in the server, switching the operational mode from the first mode to the second mode, and under a condition that the network communication device receives, from the server, an authentication-failure response indicating that the combination is not stored in the server, maintaining the operational mode in the first mode;

the external terminal registration processing includes:
under a condition that the operational mode is the second mode and that the wireless communication device receives the first identification information from the external terminal, determining whether the first record including the first identification information received from the external terminal is stored in the first database, under a condition that the first record including the first identification information received from the external terminal is stored in the first database, causing the display to display an image indicating that the first identification information is stored in the first database, and under a condition that the first record including the first identification information received from the external terminal is not stored in the first database, causing the first database to store the first record including the second identification information received by the input device and the first identification information received from the external terminal while being associated with each other; and the second authentication processing includes:
under a condition that the operational mode is the first mode and that the wireless communication device receives the first identification information from the external terminal, determining whether the first record including the first identification information received from the external terminal is stored in the first database, under a condition that the first record including the first identification information received from the external terminal is stored in the first database, obtaining the second identification information from the first record including the first identification information received from the external terminal, and transmitting the obtained second identification information to the server, under a condition that the network communication device receives, from the server, an existence response indicating that the second identification information is stored in the server, switching the operational mode from the first mode to the second mode, and under a condition that the network communication device receives, from the server, a non-existence response indicating that the second identification information is not stored in the server, maintaining the operational mode in the first mode, and under a condition that the first record including the first identification information received from the external terminal, is not stored in the first database, maintaining the operational mode in the first mode.

12. The method according to claim 11,
wherein the image processing apparatus further comprises a second database configured to store a second record, the second record including the first identification information deleted after having been stored once in the first database and deletion reason information indicating deletion reason for deleting the first identification information while being associated with each other, the external terminal registration processing further includes:
under the condition that the first record including the first identification information received from the external terminal is not stored in the first database, determining whether the second record including the first identification information received from the external terminal is stored in the second database, under a condition that the second record including the first identification information received from the external terminal is stored in the second database, deleting the second record including the first identification information received from the external terminal, from the second database, and
under a condition that the second record including the first identification information received from the external terminal is not stored in the second database, not changing contents stored in the second database.

13. The method according to claim 12,
wherein the first database and the second database are allocated within a same memory; and
a storage capacity allocated to the first database and a storage capacity allocated to the second database in the memory are changeable by the processor.

14. The method according to claim 11,
wherein the image processing apparatus further comprises a second database configured to store a second record, the second record including the second identification information deleted after having been stored once in the first database and deletion reason information indicating deletion reason for deleting the second identification information while being associated with each other,
the second authentication processing further includes,
under the condition that the first record including the first identification information received from the external terminal is not stored in the first database, determining whether the second record including the first identification information received from the external terminal is stored in the second database,
under a condition that the second record including the first identification information received from the external terminal is stored in the second database, causing the display to display an image corresponding to the deletion reason information included in the second record, and
under a condition that the second record including the first identification information received from the external terminal is not stored in the second database, causing the display to display an image indicating that the external terminal is unknown.

15. The method according to claim 14,
wherein the image processing apparatus further comprises a timer configured to retain date and time information,
in a case that the first record is stored in the first database, the first record is stored in the first database while including, in the first record, recording date and time information indicating a date and time on which the first record is stored in the first database; and
the second authentication processing further includes:
under the condition that the first record including the first identification information received from the external terminal is stored in the first database, obtaining, from the first record including the first identification information received from the external terminal, the second identification information and the recording date and time information, and determining whether the recording date and time information indicates a past date and time within a predetermined period from current date and time information retained in the timer,
under a condition that the recording date and time information indicates the past date and time within the predetermined period from the current date and time information, causing the network communication device to transmit the second identification information to the server, and
under a condition that the recording date and time information does not indicate the past date and time within the predetermined period from the current date and time information, deleting, from the first database, the first record including the first identification information received from the external terminal, and causing the second database to store the second record including the first identification information received from the external terminal and deletion information indicating that the recording date and time information does not indicate the past date and time within the predetermined period from the current date and time information while being associated with each other.

16. The method according to claim 11,
wherein the image processing apparatus further comprises a timer configured to retain date and time information,
in a case that the first record is stored in the first database, the first record is stored in the first database while including, in the first record, recording date and time information indicating a date and time on which the first record is stored in the first database; and
the second authentication processing further includes:
under the condition that the first record including the first identification information received from the external terminal is stored in the first database, obtaining, from the first record including the first identification information received from the external terminal, the second identification information and the recording date and time information, and determining whether the recording date and time information indicates a past date and time within a predetermined period from current date and time information retained in the timer,
under a condition that the recording date and time information indicates the past date and time within the predetermined period from the current date and time information, causing the network communication device to transmit the second identification information to the server, and
under a condition that the recording date and time information does not indicate the past date and time within the predetermined period from the current date and time information, deleting, from the first database, the first record including the first identification information received from the external terminal, and causing the display to display an image indicating that the recording date and time information does not indicate the past date and time within the predetermined period from the current date and time information.

17. The method according to claim 16,
wherein the image processing apparatus further comprises a second database configured to store a second record, the second record including the second identification information deleted after having been stored once in the first database and deletion reason information indicating deletion reason for deleting the second identification information while being associated with each other,
the method further includes causing the processor to execute a regular check processing;
the first record is included in a plurality of first records; and
the regular check processing includes:
confirming whether a certain first record exists among the plurality of first records stored in the first database, at a predetermined cycle, the certain first record including the recording date and time information not indicating the past date and time within the predetermined period from the current date and time information, under a condition that the certain first record including the recording date and time information not indicating the past date and time within the predetermined period from the current date and time information exists among the plurality of first records, deleting the certain first record from the first database, and causing the second database to store the second record including the first identification information included in the deleted certain first record and deletion reason information indicating that the recording date and time information does not indicate the past date and time within the predetermined period from the current date and time information while being associated with each other, and under a condition that the certain first record including the recording date and time information not indicating the past date and time within the predetermined period from the current date and time information does not exist among the plurality of first records, obtaining the second identification information from the first record stored in the first database and causing the network communication device to transmit the obtained second identification information to the server, under a condition that the network communication device receives, from the server, an existence response indicating that the second identification information is stored in the server, causing the network communication device to transmit, to the server, a query as to whether the second identification information is valid, under a condition that the network communication device receives, from the server, a valid response indicating that the second identification information is valid, not changing contents stored in each of the first database and the second database, under a condition that the network communication device receives, from the server, an invalid response indicating that the second identification information is invalid, deleting, from the first database, the first record including the second identification information transmitted to the server, and causing the second database to store the second record including the deleted second identification information and deletion information indicating that the second identification information is invalid while being associated with each other, and under a condition that the network communication device receives, from the server, a non-existence response indicating that the second identification information is not stored in the server, deleting, from the first database, the first record including the second identification information transmitted to the server, and causing the second database to store the second record including the deleted second identification information and deletion information indicating that the second identification information does not exist in the server while being associated with each other.

18. The method according to claim 16,
wherein the image processing device further comprises a second database configured to store a second record, the second record including the second identification information deleted after having been stored once in the first database and deletion reason information indicating deletion reason for deleting the second identification information while being associated with each other;

the timer includes a reset flag indicating whether the date and time information retained by the timer is reset to an initial value;

the method further includes causing the processor to execute a date and time reset processing;

the first record is included in a plurality of first records and the second record is included in a plurality of second records; and the date and time reset processing includes:

determining whether the reset flag has value indicating that the reset flag has been reset,
under a condition that the reset flag has the value indicating that the reset flag has been reset, deleting all the plurality of first records stored in the first database, and storing, in the second database, the plurality of second records each including the first identification information included in one of the deleted plurality of first records and deletion reason information indicating that the external terminal is unknown while being associated with each other, and
under a condition that the reset flag does not have the value indicating that the reset flag has been reset, not changing contents stored in the first database.

19. The method according to claim 16,
wherein the image processing apparatus further comprises a second database configured to record a second record, the second record including the second identification information deleted after having been stored once in the first database and deletion reason information indicating deletion reason for deleting the second identification information while being associated with each other;

the timer includes a reset flag indicating whether the date and time information retained by the timer is reset to an initial value;

the method further includes causing the processor to execute a date and time reset processing;

the first record is included in a plurality of first records and the second record is included in a plurality of second records; and the date and time reset processing includes:

determining whether the reset flag has a value indicating that the reset flag has been reset,
under a condition that the reset flag has the value indicating that the reset flag has been reset, deleting all the plurality of first records stored in the first database and all the plurality of second records stored in the second database, and
under a condition that the reset flag does not have the value indicating that the reset flag has been reset, not changing contents stored in each of the first database and the second database.

20. The method according to claim 11,
wherein the second authentication processing further includes:
under the condition that the network communication device receives, from the server, the existence response, causing the network communication device to transmit, to the server, a query as to whether the second identification information is valid,
under a condition that the network communication device receives, from the server, a valid response indicating that the second identification information is valid, switching the operational mode from the first mode to the second mode, and under a condition that the network communication device receives, from the server, an invalid response indicating that the second identification information is invalid, maintaining the operational mode in the first mode.

\* \* \* \* \*

UNITED STATES PATENT AND TRADEMARK OFFICE
CERTIFICATE OF CORRECTION

Page 1 of 1

PATENT NO. : 10,257,387 B2
APPLICATION NO. : 15/832009
DATED : April 9, 2019
INVENTOR(S) : Hironori Takasaki It is certified that error appears in the above-identified patent and that said Letters Patent is hereby corrected as shown below:

On the Title Page

Abstract, Line 2 should read:
ing device processing image data; a wireless communication interface Abstract, Line 5 should read:
tion interface and receiving first identification information from the Abstract, Line 9 should read:
an interface receiving the second identification information and third Abstract, Line 10 should read:
identification information; a communication interface capable of Signed and Sealed this
Twenty-fifth Day of June, 2019

Andrei Iancu
*Director of the United States Patent and Trademark Office*